(12) United States Patent
Danielson

(10) Patent No.: US 12,340,471 B2
(45) Date of Patent: Jun. 24, 2025

(54) AUGMENTED REALITY PRESENTATIONS OF INFORMATION FROM QUANTIFICATION INSTRUMENTS

(71) Applicant: HEWLETT-PACKARD DEVELOPMENT COMPANY, L.P., Spring, TX (US)

(72) Inventor: Jon David Danielson, Ft. Collins, CO (US)

(73) Assignee: Hewlett-Packard Development Company, L.P., Spring, TX (US)

(*) Notice: Subject to any disclaimer, the term of this patent is extended or adjusted under 35 U.S.C. 154(b) by 345 days.

(21) Appl. No.: 17/821,230

(22) Filed: Aug. 22, 2022

(65) Prior Publication Data

US 2024/0062476 A1    Feb. 22, 2024

(51) Int. Cl.
| G06T 19/00 | (2011.01) |
| G02B 27/01 | (2006.01) |
| G06T 7/70 | (2017.01) |
| G06V 20/20 | (2022.01) |

(52) U.S. Cl.
CPC ........ G06T 19/006 (2013.01); G02B 27/0172 (2013.01); G06T 7/70 (2017.01); G06V 20/20 (2022.01); *G06T 2207/30242* (2013.01)

(58) Field of Classification Search
CPC ......... G06T 19/006; G06T 2207/30242; G06T 7/70; G06V 20/20; G02B 27/0172
See application file for complete search history.

(56) References Cited

U.S. PATENT DOCUMENTS

| 2014/0111547 | A1 | 4/2014 | Bilbrey et al. |
| 2016/0314623 | A1* | 10/2016 | Coleman ................ B23D 59/00 |
| 2019/0162516 | A1* | 5/2019 | Abe ......................... G01B 3/22 |
| 2019/0282324 | A1* | 9/2019 | Freeman .............. A61H 31/005 |
| 2020/0026086 | A1* | 1/2020 | Hendron ............ G02B 27/0172 |
| 2020/0358833 | A1* | 11/2020 | Pavloff ................... H04L 65/61 |
| 2021/0071896 | A1* | 3/2021 | Steiner ..................... F24F 11/52 |

OTHER PUBLICATIONS

Lightguide, "6 Uses of Augmented Reality for Manufacturing in Every Industry", online available at <https://www.lightguidesys.com/resource-center/blog/6-uses-of-augmented-reality-for-manufacturing-in-every-industry/>, Feb. 23, 2022, 18 pages.

* cited by examiner

*Primary Examiner* — David Perlman
(74) *Attorney, Agent, or Firm* — Quarles & Brady LLP

(57) ABSTRACT

In some examples, a head-mounted device (HMD) includes a display device to present an augmented reality (AR) view. The HMD receives first output information generated by a first type of quantification instrument that is to perform a first quantification of a collection of physical objects, and second output information generated by a second type of measurement instrument that is different from the first type of measurement instrument to perform a second quantification of the collection of physical objects. The HMD presents, on the display device, the first output information and the second output information in the augmented reality view of a physical environment in which the collection of physical objects being quantified objects is provided.

20 Claims, 4 Drawing Sheets

AUGMENTED REALITY PRESENTATIONS OF INFORMATION FROM QUANTIFICATION INSTRUMENTS

BACKGROUND

Measurement instruments can be used to quantify physical objects, based on collecting measured parameters relating to the physical objects. In addition, equipment or processes can be controlled using control instruments. The control instruments can have input control elements that can be adjusted by users as part of controlling the equipment or processes. The control instruments can include or be associated with measurement instruments that are used to quantify aspects of the equipment or processes being controlled.

BRIEF DESCRIPTION OF THE DRAWINGS

Some implementations of the present disclosure are described with respect to the following figures.

Figure 1:
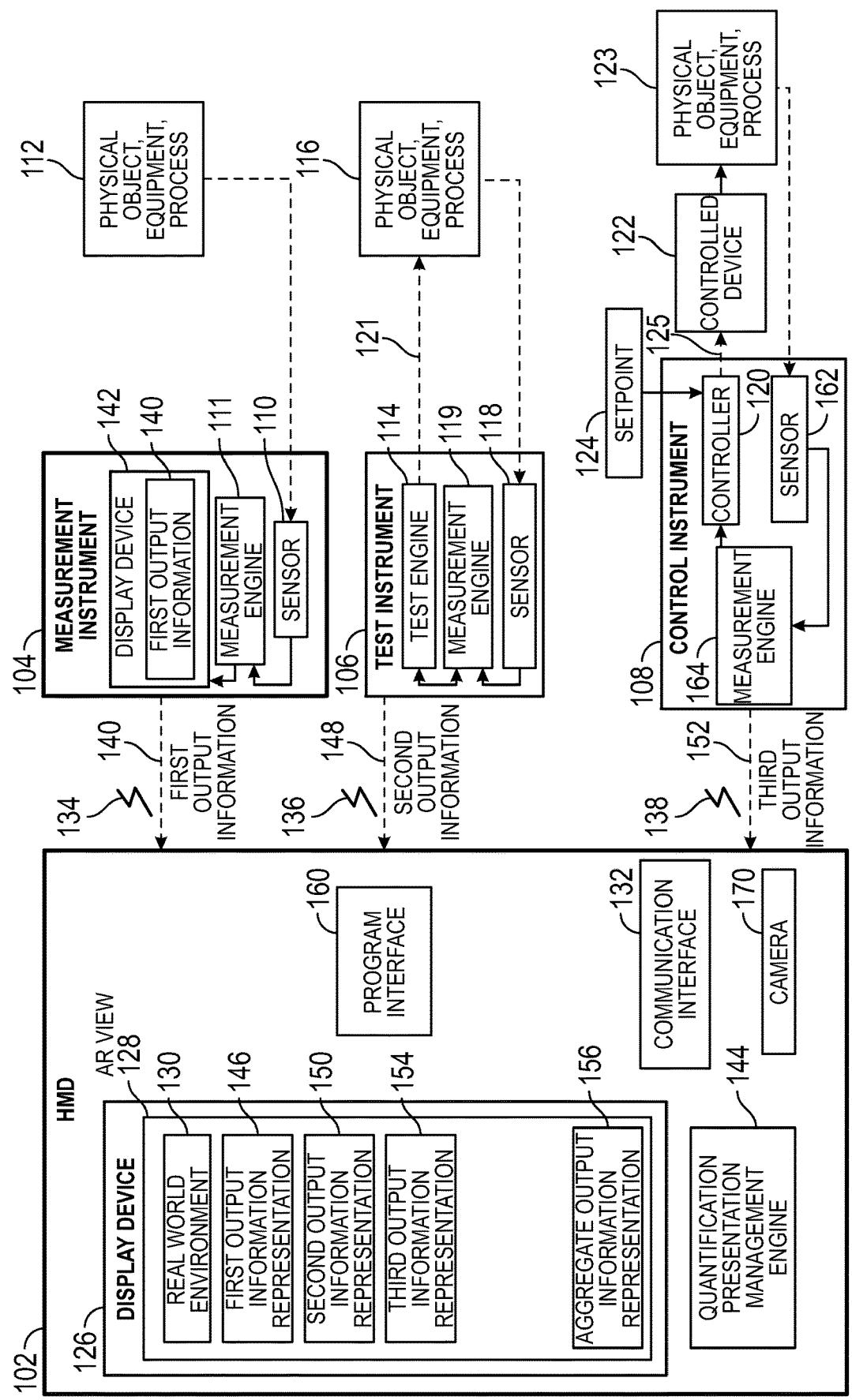
FIG. 1 is a block diagram of an arrangement that includes quantification instruments and a head-mounted device (HMD) to present an augmented reality (AR) view of output information from the quantification instruments, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A "quantification instrument" can refer to an instrument that can be used to quantify a collection of physical objects for any of various purposes. As used here, a "collection" of items can refer to a single item or multiple items. Thus, a "collection of physical objects" can refer to a single physical object or multiple physical objects. "Quantifying" a physical object can refer to taking a measurement to obtain a collection of properties related to the physical object, and/or testing the physical object and acquiring a collection of properties related to the physical object as part of the measuring, testing, and/or controlling the physical object or equipment or a process involving the physical object and acquiring a collection of properties related to the physical object during or in response to the control.

In some examples, a quantification instrument can include a measurement instrument with a collection of sensors to acquire a collection of properties related to a physical object Another example of a quantification instrument can be a test instrument that performs a test on a physical object. The test instrument is able to acquire an output produced by the physical object in response to a test input. For example, a test can involve applying an electrical voltage or an electrical current to a physical object, and the physical object can respond to the test by producing an output that can be acquired by the test instrument. As another example, a test can include a series of tasks to be performed by a physical object, which produces an output that can be acquired by the test instrument, where the output is produced by the physical object after performing the series of tasks.

In further examples, a quantification instrument can include a control instrument that is used to manipulate a controlled device that can alter any or some combination of the following: a physical object being quantified, equipment that is involved in an operation relative to the physical object, or a process that involves the physical object. The control instrument can include or be associated with a measurement instrument that can be used to quantify a physical object as part of or in response to the manipulation of the physical object, equipment, and/or process. Equipment that is manipulated can include industrial equipment, manufacturing equipment, test equipment, monitoring equipment, and so forth. Manipulating a process can refer to controlling tasks that are performed (e.g., an order of the tasks, what tasks are included or omitted, etc.), and attributes of the process (e.g., a length of time of each task, an environmental condition to be set during each task, etc.).

As an example, a controlled device can include an adjustable valve or another fluid control device, and a sensor (e.g., a flowmeter) used to measure a fluid flow rate through the adjustable valve or other fluid control device. As another example, a control instrument can include a thermostat that can control a temperature in a target environment, and a temperature sensor to sense the temperature in the target environment. Another example control instrument can include a chemical process controller that controls chemical aspects of a process (e.g., mass flow rate of a chemical, pH of a solution, etc.). A further example of a control instrument can include an industrial control instrument to control industrial processes.

A property related to a physical object to be quantified can include any or some combination of the following: a property of the physical object, a property of an equipment or of a process involving the physical object, or a property of an environment around the measured physical object. A property that is quantified can include a physical property (e.g., strain, force, density, temperature, pressure, humidity, speed, acceleration, fluid flow rate, location, orientation, etc.), a chemical property (e.g., a pH level, toxicity, chemical stability, etc.), an electrical property (e.g., voltage, current, resistance, inductance, capacitance, etc.), a medical property (e.g., heart rate, oxygen saturation level, etc.), an equipment property (e.g., a control setting of an equipment, such as a setting for a valve, a setting of a thermostat, etc.), a process property (e.g., error rate, yield in manufacturing devices, etc.), or any other property.

Examples of contexts in which quantification instruments can be used include manufacturing or assembly of devices, testing of devices during production (such as to perform quality assurance), experimentation and development, facility monitoring, or other contexts. The physical objects that are quantified can include the devices that are being developed, manufactured, assembled, or tested. Examples of devices include electronic devices (e.g., computers, smartphones, game appliances, Internet-of-Things (IoT) devices, etc.), chemicals, raw materials (metals, plastics, etc.), appliances, vehicles, footwear, clothing, or any other devices.

Alternatively, the physical objects that are quantified include equipment and/or a process and/or an environment relating to the development, manufacture, assembly, or testing of devices.

In some cases, multiple quantification instruments can be used to perform quantifications of a collection of physical objects. For example, a user may have to hold multiple different quantification instruments in their hands while making the measurements and possibly performing a control and/or test of the collection of physical objects. Having to manipulate multiple different quantification instruments can result in the user not being able to perform other tasks while the user is holding the multiple different quantification instruments. Also, if the user were to place a quantification instrument on a surface, such as a table, the quantification instrument may be in a location or at an orientation that can make it difficult for the user to easily see the output displayed by the measurement instrument. Additionally, if multiple quantification instruments are located at different locations, it may be difficult or even impossible to simultaneously see outputs displayed by the multiple quantification instruments.

In further cases, some quantification instruments may be located far away from one another, such that a user would have to move between the quantification instruments to see the outputs of the quantification instruments.

In accordance with some implementations of the present disclosure, a head-mounted device (HMD) is used to present an augmented reality (AR) view that displays representations of output information generated by different types of quantification instruments when quantifying a collection of physical objects. The AR view also presents a physical environment in which the collection of physical objects being quantified is provided. For example, the physical environment can include a development site, a manufacturing facility, a processing plant, an assembly facility, a test facility, a retail outlet, a user's home, and so forth.

FIG. 1 is a block diagram of an example arrangement that includes an HMD 102 and various quantification instruments, including a measurement instrument 104, a test instrument 106, and a control instrument 108. Although specific quantification instruments and a specific number of the quantification instruments are shown in FIG. 1, in other examples, different types of quantification instruments and different numbers of quantification instruments can be provided.

For example, multiple different types of measurement instruments can be provided, and/or multiple different types of test instruments can be provided, and/or multiple different types of control instruments can be provided.

The HMD 102 can include any or some combination of the following: a headset worn over the head of a user, electronic eyeglasses capable of overlaying digital or electronic information over the physical world (e.g., waveguide optic lens, prismatic lens, half mirror optics, etc.), or any other electronic device that can be worn on the head of a user and that has a collection of display devices visible to the user when worn by the user.

The measurement instrument 104 includes a sensor 110 to measure a property of a physical object, equipment, or process (OEP) 112. Although FIG. 1 depicts each of the instruments 104, 106, and 108 including one sensor, it is noted that in further examples, any of the instruments can include multiple sensors.

A sensor of a quantification instrument can take a measurement of a property related to a physical object by being brought in proximity or even into contact with the physical object. Alternatively, the sensor can be located a large distance away from the physical object while taking a measurement of a property relating to the physical object. As noted above, a property related to a measured physical object can include a property of the measured physical object and/or a property of an equipment and/or a property of a process in which the measured physical object is involved and/or a property of the environment around the measured physical object.

The measurement instrument 104 includes a measurement engine 111 that can receive the measurement data from the sensor 110 and produce a representation of the measurement data that can be displayed by a display device 142 that may be present in the measurement instrument 104. For example, the measurement engine 111 can produce first output information 140 based on the measurement data from the sensor 110, which can be displayed by the display device and transmitted to the HMD 102. As an example, the sensor 110 can output analog measurement data, and the measurement engine 111 can digitize the analog measurement data to produce digital measurement data included in the first output information 140.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit The test instrument 106 includes a test engine 114 that is able to perform a test of an OEP 116. The test engine 114 applies a test input 121 to the OEP 116, where the test input 121 can include any of the following types of stimulus: an electrical signal, a physical force, and so forth. In some cases, a stimulus to the OEP 116 may further be applied by another entity, such as a user or a machine.

The test instrument 106 also includes a sensor 118 that is able to measure a property related to the OEP 116 during a test performed by the test engine 114 or in response to the test performed by the test engine 114. The measurement data from the sensor 118 is provided to a measurement engine 119, which produces second output information 148 based on the measurement data that can be sent to the HMD 102 and possibly the test engine 114.

The control instrument 108 includes a controller 120 that can be used to manipulate, using a control input 125, a controlled device 122 according to a setpoint 124 input to the controller 120. For example, the setpoint 124 can be provided using a knob or other user adjustable element (e.g., an element of a graphical user interface or GUI) that allows a user to adjust the setpoint 124. The controlled device 122 is controlled by the controller 120 to adjust an OEP 123 to meet the setpoint 124. Note that the controller 120 may receive multiple setpoints, and/or may control multiple controlled devices.

The control instrument 108 includes a sensor 162 to measure a property of the OEP 123. Measurement data from the sensor 162 is provided to a measurement engine 164, which produces third output information 152 that can be provided to the HMD 102 and possibly to the controller 120.

Although FIG. 1 shows examples in which the different quantification instruments (e.g., 104, 106, and 108) are applied with respect to different OEPs 112, 116, and 123, in other examples, two or more than two quantification instruments can be applied with respect to the same OEP.

The HMD 102 includes a display device 126 to display an AR view 128. Note that the display device 126 can include a single display device or multiple display devices, such as one display device for each eye of a user.

The AR view 128 depicts an image of a real-world environment 130 (or physical environment) where the HMD 102 is located. The real-world environment can include a physical space in which the HMD 102 is located, and can include physical objects that are to be quantified, quantification instruments (e.g., 104, 106, 108), equipment to be used in the quantification of the physical objects, furniture, and so forth.

The HMD 102 includes a communication interface 132 that is able to establish electronic communication links with the respective measurement instrument 104, test instrument 106, and control instrument 108. The communication interface 132 can include a transceiver to send and receive signals over an electronic communication link. In some examples, the electronic communication links can include wireless communication links. In other examples, some of the electronic communication links can include wired communication links.

Examples of wireless communication links can include a Bluetooth link, a Wi-Fi link, an infrared link, a radio frequency identification (RFID) link, and so forth. A wired communication link can be established over an electrical cable, such as a Universal Serial Bus (USB) cable, or any other type of cable.

The measurement instrument 104 can send the first output information 140 over an electronic communication link 134 to the HMD 102. The first output information 140 can include measurement information, which can be collected by the sensor 110 of the measurement instrument 104.

The measurement instrument 104 can also include the display device 142 that can display the first output information 140. In some examples, the display device 142 of the measurement instrument 104 presents raw measurement data acquired by the sensor 110, such as the instantaneous measurement data from the sensor 110.

The HMD 102 includes a quantification presentation management engine 144 that is able to present a representation of the first output information 140 in the AR view 128. This representation of the first output information 140 includes a first output information representation 146 in the AR view 128. The first output information representation 146 can include the raw measurement data of the sensor 110. Alternatively or additionally, the first output information representation 146 can include an output in a form different from the raw measurement data. For example, the quantification presentation management engine 144 can generate, based on processing the first output information 140, a graph, a table, or any other view of the first output information 140 to include in the first output information representation 146. The processing can include any or some combination of converting the first output information 140, performing computations (e.g., filtering) based on the first output information 140, and so forth.

The test instrument 106 sends the second output information 148 over an electronic communication link 136 to the HMD 102. The second output information 148 can include measurement data from the sensor 118, the test input provided by the test instrument 106, and possibly other information such as information pertaining to a test that was performed by the test engine 114 on the OEP 116. The quantification presentation management engine 144 presents, based on the second output information 148, a second output information representation 150 in the AR view 128. For example, the second output information representation 150 can include raw measurement data from the sensor 118 and possibly test information. Additionally or alternatively, the quantification presentation management engine 144 can generate a view that is based on processing the second output information 148.

The control instrument 108 sends the third output information 152 over an electronic communication link 138 to the HMD 102. The third output information 152 can include measurement data from the sensor 162 of the control instrument 108, and possibly include manipulation information pertaining to a control of the controlled device 122. The manipulation information can include a setpoint (e.g., 160), or any other information pertaining to the manipulation of any of the OEP 123. The quantification presentation management engine 144 generates, based on the third output information 152, a third output information representation 154 in the AR view 128. The third output information representation 154 can include the raw measurement data from the sensor 162 and possibly manipulation information relating to the control elements 120 of the control instrument 108. Alternatively or additionally, the quantification presentation management engine 144 can generate a view (e.g., graphs, tables, etc.) of the third output information 152 based on processing the third output information 152.

Although not shown in FIG. 1, each of the test instrument 106 and/or the control instrument 108 can include a display device to display the respective second output information 148 and the third output information 152.

In some examples, an output information representation (any of 146, 150, and 154) can be a mirror of the respective output information displayed by the respective quantification instrument. Display mirroring refers to presenting whatever is displayed by the display device of the respective quantification instrument in the AR view 128 as the corresponding output information representation.

In other examples, as noted above, the quantification presentation management engine 144 can process output information from the respective quantification instrument to produce a different form of output information.

In further examples, the quantification presentation management engine 144 can combine multiple output information from multiple quantification instruments into an aggregate output information representation 156 that can be included in the AR view 128. For example, the quantification presentation management engine 144 can combine some combination of the first output information 140, the second output information 148, and the third output information 152 to produce the aggregate output information representation 156. As examples, the aggregate output information representation 156 can be in the form of a graph that presents different curves representing the different output information, a table that lists values of different output information, or any other representation that combines the multiple output information. The aggregate output information representation 156 may also include values derived from combining multiple output information from different quantification measures, where the combining can include summing, averaging, or any other type of computation based on the multiple output information.

In some examples, the HMD 102 can connect with multiple quantification instruments simultaneously, to allow for concurrent reception of respective output information from the multiple quantification instruments such that the output information can be presented together in the AR view 128. In some cases, the positions of each output information representation (including any of 146, 150, 154, and 156) can be adjusted by a user of the HMD 102. For example, the user can select any output information representation and move the output information representation to a desired position in the AR view 128.

In some examples, the HMD 102 can store output information (e.g., 134, 136, or 138) in a storage medium of the HMD 102 for later use, such as by the quantification presentation management engine 144.

In some examples, the output information representations can be moved to positions in the AR view 128 so that the output information representations do not obstruct the user's view of the real-world environment. In other examples, a designated output information representation(s) can be placed in the user's field of view in the AR view 128 at all times. The latter examples can be in the form of a head-up display (HUD) view where the designated output information representation(s) in the head-up display view remains in the user's field of view regardless of the motion of the user or the user's head. For example, even if the user were to rotate his or her head or to move to a different location, the quantification presentation management engine 144 maintains the designated output information representation(s) in the field of view of the AR view 128. In such examples, the designated output information representation(s) remain(s) fixed relative to the user so that the designated output information representation(s) remains visible to the user at all times when using the HMD 102 to view output information from quantification instruments.

In other examples, the designated output information representation(s) can remain fixed relative to the physical space corresponding to the real-world environment. Thus, for example, a given output information representation may be visible when the user is facing a first orientation or is at a first location. However, the quantification presentation management engine 144 can hide the given designated output information representation from the AR view 128 when the user faces a second orientation that is different from the first orientation (e.g., by greater than some rotational angle) or the user is at a different second location.

The HMD 102 includes a program interface 160 that can be used for interactions between each quantification instrument and the HMD 102. For example, the program interface 160 can include an application programming interface (API) that includes software routines that can be invoked by a quantification instrument to communicate output information from the quantification instrument to the HMD 102 to cause display of a representation of the output information in an AR view such as the AR view 128. As another example, the program interface 160 can be in the form of a software library.

Although not shown, each of the measurement instrument 104, the test instrument 106, and the control instrument 108 can include a program (including machine-readable instructions) that is able to access the program interface 160 for the purpose of sending respective output information for inclusion in the AR view 128.

In some examples, the HMD 102 may include a camera 170 that can be activated to capture digital images or videos with (or without) augmented overlays of the quantification instrument data. The digital images can be stored in a storage medium of the HMD 102 for later use. The HMD 102 can also record user notes, user dictations, and so forth.

Figure 2:
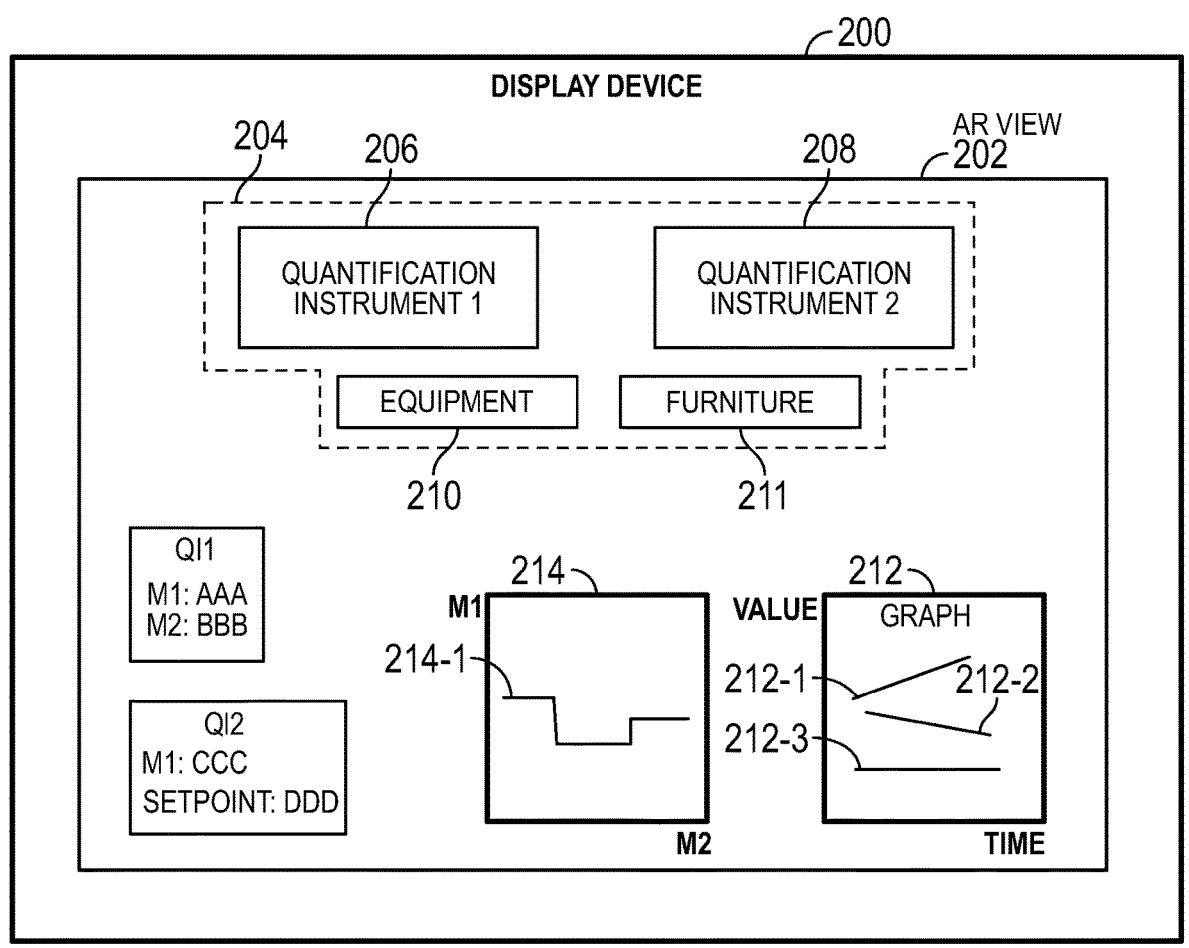
FIG. 2 is a view of AR content displayed by a display device of the HMD, according to some examples.

FIG. 2 is a block diagram of a display device 200 that can present an AR view 202. The AR view 202 includes a representation 204 of a real-world environment that includes a first quantification instrument 206, a second quantification instrument 208, equipment 210 that can be manipulated by a control instrument (e.g., one of the quantification instruments 206 and 208), and furniture 211 (e.g., a work table or other furniture on which any of the items 206, 208, and 210 can be placed). In further examples, the real-world environment can include other items.

The AR view 202, which can be presented by the quantification presentation management engine 144, for example, can include a first output information representation QI1 that includes measurement data M1 and M2 of the quantification instrument 206, for example.

The AR view can also include a second output information representation QI2 that includes measurement data M1 and a setpoint of the quantification instrument 208. In such an example, the quantification instrument 208 is a control instrument.

The quantification presentation management engine 144 can also include a graph 212 in the AR view 202, which is an example of the aggregate output information representation 156 of FIG. 1. The graph 212 depicts output information from multiple quantification instruments. The graph 212 includes a curve 212-1 and a curve 212-2. The curve 212-1 plots values of measurement data from the quantification instrument 206 as a function of time, and the curve 212-2 plots values of measurement data from the quantification instrument 208 as a function of time, for example. The graph 212 can also include an aggregate curve 212-3 that is derived by performing a mathematical aggregate (e.g., a sum, an average, etc.) of measurement data from multiple quantification instruments.

As another example, the quantification presentation management engine 144 can generate another graph 214 in the AR view 202, where the graph 214 plots, in a curve 214-1, measurement data (M1) from the quantification instrument 206 with respect to measurement data (M2) from the quantification instrument 208.

Figure 3:
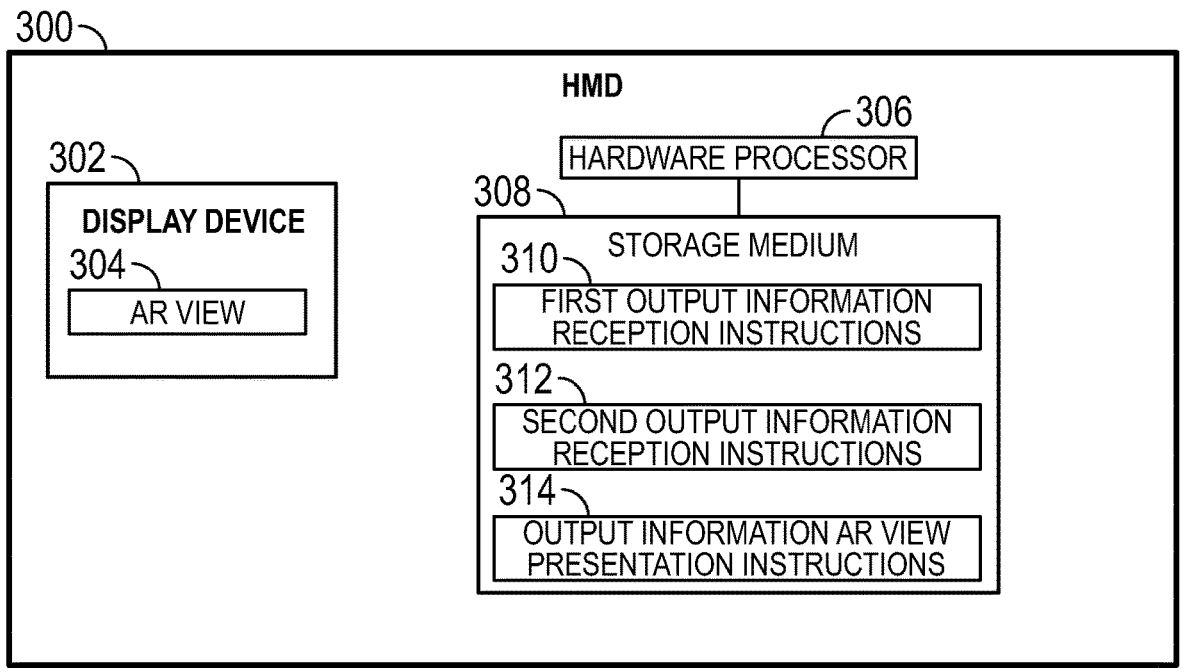
FIG. 3 is a block diagram of an HMD according to some examples.

FIG. 3 is a block diagram of an HMD 300 that includes a display device 302 to present an AR view 304. The HMD 300 includes a hardware processor 306 (or multiple hardware processors). A hardware processor can include a microprocessor, a core of a multi-core microprocessor, a microcontroller, a programmable integrated circuit, a programmable gate array, or another hardware processing circuit.

The HMD 300 includes a storage medium 308 storing machine-readable instructions executable on the hardware processor 306 to perform various tasks. Machine-readable instructions executable on a hardware processor can refer to the instructions executable on a single hardware processor or the instructions executable on multiple hardware processors.

The machine-readable instructions include first output information reception instructions 310 to receive first output information generated by a first type of quantification instrument that is to perform a first quantification of a collection of physical objects.

The machine-readable instructions include second output information reception instructions 312 to receive second output information generated by a second type of measurement instrument that is different from the first type of measurement instrument to perform a second quantification of the collection of physical objects.

The machine-readable instructions include output information AR view presentation instructions 314 to present, on the display device 302, the first output information and the second output information in the AR view 304 of a physical environment in which the collection of physical objects being quantified objects is provided.

In some examples, the first type of quantification instrument is to measure or test a property of the collection of physical objects.

In some examples, the second type of quantification instrument is to control equipment or a process relating to the collection of physical objects.

In some examples, the machine-readable instructions combine the first output information and the second output information in an aggregate representation, and include the aggregate representation in the AR view 304.

In some examples, the machine-readable instructions present a representation of the first output information and the second output information simultaneously in the AR view 304 displayed by the display device 302, such as in the form of a graph or any other representation.

Figure 4:
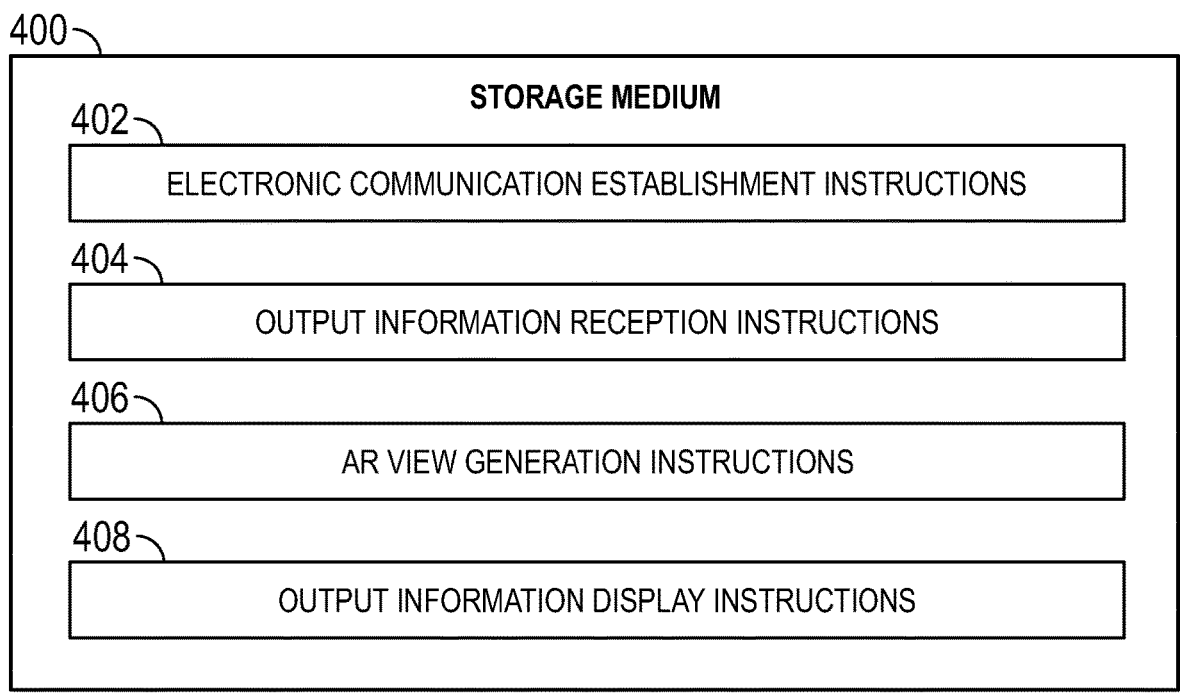
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause an HMD to perform various tasks.

The machine-readable instructions in the storage medium 400 include electronic communication establishment instructions 402 to control establishment of respective electronic communication links with different types of quantification instruments that perform measurements on a collection of physical objects.

The machine-readable instructions in the storage medium 400 include output information reception instructions 404 to receive, over the electronic communication links, different output information generated by the different types of quantification instruments.

The machine-readable instructions in the storage medium 400 include AR view generation instructions 406 to generate, for display by a display device of the HMD, an AR view of a physical environment in which the collection of physical objects being quantified is provided.

The machine-readable instructions in the storage medium 400 include output information display instructions 408 to cause simultaneous display of the different output information from the different types of quantification instruments in the AR view.

Figure 5:
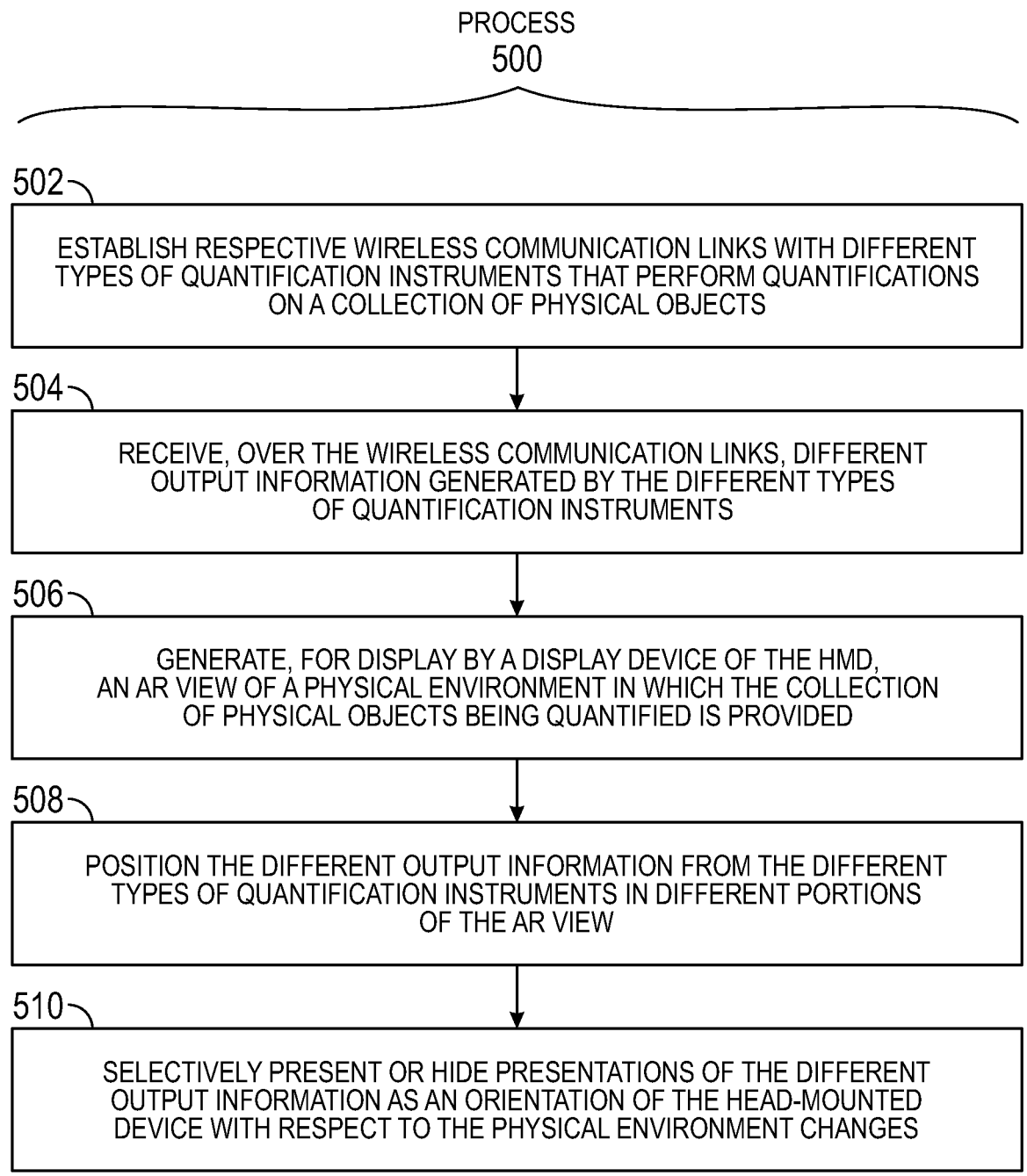
FIG. 5 is a flow diagram of a process according to some examples.

FIG. 5 is a flow diagram of a process 500 according to some examples, which may be performed by an HMD, such as the HMD 102 of FIG. 1.

The process 500 includes establishing (at 502) respective wireless communication links with different types of quantification instruments that perform quantifications on a collection of physical objects.

The process 500 includes receiving (at 504), over the wireless communication links, different output information generated by the different types of quantification instruments.

The process 500 includes generating (at 506), for display by a display device of the HMD, an AR view of a physical environment in which the collection of physical objects being quantified is provided.

The process 500 includes positioning (at 508) the different output information from the different types of quantification instruments in different portions of the AR view.

The process 500 includes selectively presenting or hiding (at 510) presentations of the different output information as an orientation of the head-mounted device with respect to the physical environment changes.

A storage medium (e.g. 308 in FIG. 3 or 400 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A head-mounted device comprising:
a display device to present an augmented reality view;
a processor; and
a non-transitory storage medium storing instructions executable on the processor to:
receive first output information generated by a first type of quantification instrument that is to perform a first quantification of a collection of physical objects;
receive second output information generated by a second type of quantification instrument that is different from the first type of quantification instrument to perform a second quantification of the collection of physical objects, wherein the second type of quantification instrument is to control equipment or a process relating to the collection of physical objects and wherein the second output information includes measurement data and a setpoint of the second type of quantification instrument; and
present, on the display device, the first output information and the second output information in the augmented reality view of a physical environment in which the collection of physical objects being quantified is provided.

2. The head-mounted device of claim 1, wherein the first type of quantification instrument is to measure or test a property of the collection of physical objects.

3. The head-mounted device of claim 1, wherein the first type of quantification instrument is to perform the first quantification of a first physical object of the collection of physical objects, and the second type of quantification instrument is to perform the second quantification of a second physical object of the collection of physical objects.

4. The head-mounted device of claim 1, wherein the head-mounted device is to establish a first electronic communication link with the first type of quantification instrument over which the first output information is received, and the head-mounted device is to establish a second electronic communication link with the second type of quantification instrument over which the second output information is received.

5. The head-mounted device of claim 1, wherein the instructions are executable on the processor to:
perform display mirroring to present the first output information from the first type of quantification instrument in the augmented reality view, the first output information also displayed at the first type of quantification instrument.

6. The head-mounted device of claim 1, wherein the instructions executable on the processor to:
present, in the augmented reality view, the first output information in a form that is different from a form of the first output information displayed at the first type of quantification instrument.

7. The head-mounted device of claim 1, wherein the instructions executable on the processor to:
combine the first output information and the second output information in an aggregate representation; and
include the aggregate representation in the augmented reality view.

8. The head-mounted device of claim 1, comprising a program interface useable by each of the first type of quantification instrument and the second type of quantification instrument to communicate with the head-mounted device.

9. The head-mounted device of claim 1, wherein the instructions executable on the processor to present a representation of the first output information and the second output information simultaneously in the augmented reality view displayed by the display device.

10. The head-mounted device of claim 1, wherein the first output information or the second output information are fixed relative to a physical space in the augmented reality view.

11. The head-mounted device of claim 1, wherein the instructions executable on the processor to:
present the first output information in the augmented reality view when the head-mounted device is oriented in a first direction with respect to the physical environment; and
hide the first output information such that the first output information is not in the augmented reality view when the head-mounted device is oriented in a different second direction with respect to the physical environment.

12. The head-mounted device of claim 8, wherein the program interface is an application programming interface (API) that includes a plurality of software routines invokable by the first type of quantitation instrument and the second type of quantitation instrument to communicate the first output information and the second output information, respectively, from the first type of quantitation instrument and the second type of quantitation instrument to the head-mounted device.

13. The head-mounted device of claim 1, wherein the first output information or the second output information are fixed relative to a user in the augmented reality view such that the first output information or the second output information is maintained within a field of view of the user.

14. The head-mounted device of claim 7, wherein the aggregated representation is a graphical representation that includes both the first output information and the second output information such that the graphical representation illustrates a relationship between the first output information and the second output information.

15. The head-mounted device of claim 1, wherein the first type of quantification instrument is a test instrument to test a property of the collection of physical objects via application of a test input to the collection of physical objects, the test instrument to include a sensor to measure a property of the collection of physical objects responsive to the test input.

16. The head-mounted device of claim 1, wherein the augmented reality depicts an image of a real-world environment where the head-mounted device is located, including the collection of physical objects, the first type of quantification instrument, and the second type of quantification instrument.

17. The head-mounted device of claim 1, wherein the instructions are executable on the processor to:
receive third output information generated by a third type of quantification instrument that is different from the first type of quantification instrument and the second type of quantification instrument, wherein the first type of quantification instrument is a measurement instrument to measure a property relating to the collection of physical objects, the second type of quantification instrument is a control instrument to control, using a setpoint, a controlled device relating to the collection of physical objects, and the third type of quantification instrument is a test instrument to execute, using a test input, a test relating to the collection of physical objects.

18. A non-transitory machine-readable storage medium comprising instructions that upon execution cause a head-mounted device to:
control establishment of respective wireless communication links with different types of quantification instruments that perform quantifications on a collection of physical objects, wherein the different types of quantification instruments include a test instrument, a measurement instrument, and a control instrument;
receive, over the wireless communication links, different output information generated by the different types of quantification instruments;
generate, for display by a display device of the head-mounted device, an augmented reality view of a physical environment in which the collection of physical objects being quantified is provided; and
cause simultaneous display of the different output information from the different types of quantification instruments in the augmented reality view.

19. The non-transitory machine-readable storage medium of claim 18, wherein instructions that upon execution cause a head-mounted device to:
cause display, in the augmented reality view, of first output information from a first quantification instrument of the different types of quantification instruments when the head-mounted device has a first orientation with respect to the physical environment; and
hide the first output information from the augmented reality view when the head-mounted device has a different second orientation with respect to the physical environment.

20. A method of a head-mounted device, comprising:
establishing respective wireless communication links with different types of quantification instruments that perform quantifications on a collection of physical objects, the different types of quantification instruments including a measurement instrument, a control instrument, and a test instrument;

receiving, over the wireless communication links, different output information generated by the different types of quantification instruments;

generating, for display by a display device of the head-mounted device, an augmented reality view of a physical environment in which the collection of physical objects being quantified is provided;

positioning the different output information from the different types of quantification instruments in different portions of the augmented reality view based on corresponding user-selected desired positions; and selectively presenting or hiding presentations of the different output information as an orientation of the head-mounted device with respect to the physical environment changes.

* * * * *